(12) United States Patent
Dorgan et al.

(10) Patent No.: US 9,303,127 B2
(45) Date of Patent: Apr. 5, 2016

(54) LIGNIN EXTRACTION FROM LIGNOCELLULOSICS

(71) Applicants: John R. Dorgan, Golden, CO (US);
Michael Paul Eyser, Denver, CO (US);
Clayton Perbix, Golden, CO (US)

(72) Inventors: John R. Dorgan, Golden, CO (US);
Michael Paul Eyser, Denver, CO (US);
Clayton Perbix, Golden, CO (US)

(73) Assignee: Colorado School of Mines, Golden, CO (US)

(*) Notice: Subject to any disclaimer, the term of this patent is extended or adjusted under 35 U.S.C. 154(b) by 0 days.

(21) Appl. No.: 14/015,727

(22) Filed: Aug. 30, 2013

(65) Prior Publication Data

US 2014/0066608 A1 Mar. 6, 2014

Related U.S. Application Data

(60) Provisional application No. 61/695,852, filed on Aug. 31, 2012.

(51) Int. Cl.
| | |
|---|---|
| *C08H 8/00* | (2010.01) |
| *C08H 7/00* | (2011.01) |
| *D21C 3/04* | (2006.01) |
| *C08L 97/00* | (2006.01) |
| *D21C 3/02* | (2006.01) |

(52) U.S. Cl.
CPC .. *C08H 8/00* (2013.01); *C08H 6/00* (2013.01);
*C08L 97/005* (2013.01); *D21C 3/04* (2013.01);
*D21C 3/02* (2013.01)

(58) Field of Classification Search
CPC ........... C08H 8/00; C08H 6/00; C08L 97/005
USPC ................................................. 530/500–507
See application file for complete search history.

(56) References Cited

U.S. PATENT DOCUMENTS

| | | | | |
|---|---|---|---|---|
| 4,395,543 | A * | 7/1983 | Wang et al. ...................... | 536/56 |
| 7,649,086 | B2 | 1/2010 | Belanger et al. | |
| 7,682,548 | B2 | 3/2010 | Nishida et al. | |
| 8,053,566 | B2 | 11/2011 | Belanger et al. | |
| 2009/0062516 | A1* | 3/2009 | Belanger et al. .............. | 530/502 |
| 2009/0118452 | A1* | 5/2009 | Seppala ........................ | 527/400 |
| 2010/0152428 | A1 | 6/2010 | Gifford et al. | |
| 2012/0071591 | A1 | 3/2012 | Mohanty et al. | |
| 2013/0029406 | A1* | 1/2013 | Dottori et al. .................. | 435/274 |
| 2013/0281582 | A1 | 10/2013 | Dorgan et al. | |

FOREIGN PATENT DOCUMENTS

GB 992114 A * 5/1965

OTHER PUBLICATIONS

Table of Acids with Ka and pKa Value, downloaded from internet on Jul. 7, 2014.*
"Chemicals used for Ph Adjustment," www.phadjustment.com, from the Internet Archive WaybackMachine, Jan. 8, 2010.*
Source Code for: https://web.archive.org/web/20100108055102/http://www.phadjustment.com/NeutralizationChemicals.htm, downloaded on Jan. 21, 2015, and documenting a website archived on Jan. 8, 2010.*
"Sodium Hydroxide," on http://www.phadjustment.com/SodiumHydroxide.htm, archived by the WaybackMachine on Apr. 2, 2009.*
Alonso et al., "Determination of curing kinetic parameters of lignin-phenol-formaldehyde resol resins by several dynamic differential scanning calorimetry methods," Thermochimica Acta, 2004, vol. 419, Iss. 1-2, pp. 161-167.
Arato et al., "The Lignol Approach to Biorefining of Woody Biomass to Produce Ethanol and Chemicals," Twenty-Sixth Symposium on Biotechnology for Fuels and Chemicals, (Ed. Davison), Humana Press, 2005, pp. 871-882.
çetin et al., "Use of organosolv lignin in phenol-formaldehyde resins for particleboard production: I. Organosolv lignin modified resins," International Journal of Adhesion and Adhesives, 2002, vol. 22, Iss. 6, pp. 477-480.
Doherty et al., "Value-adding to cellulosic ethanol: Lignin polymers," Industrial Crops and Products, 2011, vol. 33, Iss. 2, pp. 259-276.
Dorgan et al., "Fundamental solution and single-chain properties of polylactides," Journal of Polymer Science Part B: Polymer Physics, 2005, vol. 43, Iss. 21, pp. 3100-3111.
Georgopoulos et al., "Thermoplastic polymers reinforced with fibrous agricultural residues," Polymer Degradation and Stability, 2005, vol. 90, Iss. 2, pp. 303-312.
Gratzl et al, "Chapter 20: Chemistry of Pulping: Lignin Reactions," Lignin: Historical, Biological, and Materials Perspectives, (Ed. Glasser), American Chemical Society, 1999, pp. 392-421.
Hatakeyama et al., "Lignin Structure, Properties, and Applications," Advances in Polymer Science—Biopolymers, 2010, vol. 232, pp. 1-63.
Henton et al., "Chapter 16: Polylactic Acid Technology," Natural Fibers, Biopolymers, and Biocomposites, (Ed. Mohanty et al.), CRC Press, 2005,pp. 527-577.
Koljonen et al., "Precipitation of lignin and extractives on kraft pulp: effect on surface chemistry, surface morphology and paper strength," Cellulose, 2004, vol. 11, Iss. 2, pp. 209-224.
Košíková et al., "Role of lignin filler in stabilization of natural rubber-based composites," Journal of Applied Polymer Science, 2007, vol. 103, Iss. 2, pp. 1226-1231.
Le Digabel et al., "Properties of thermoplastic composites based on wheat-straw lignocellulosic fillers," Journal of Applied Polymer Science, 2004, vol. 93, Iss. 1, pp. 428-436.
Li et al., "Alkylated Kraft Lignin-Based Thermoplastic Blends with Aliphatic Polyesters," Macromolecules, 2002, vol. 35, Iss. 26, pp. 9707-9715.

(Continued)

*Primary Examiner* — Liam J Heincer
*Assistant Examiner* — Nicholas Hill
(74) *Attorney, Agent, or Firm* — Sheridan Ross P.C.

(57) ABSTRACT

The present invention is directed to a method to extract lignin from lignocellulosic biomass using lactic acid.

20 Claims, 6 Drawing Sheets

(56) References Cited

OTHER PUBLICATIONS

Lora et al. "Recent Industrial Applications of Lignin: A Sustainable Alternative to Nonrenewable Materials," Journal of Polymers and the Environment, 2002, vol. 10, Iss. 1-2, pp. 39-48.

Meister et al., "Graft 1-phenylethylene copolymers of lignin. 1. Synthesis and proof of copolymerization," Macromolecules, 1991, vol. 24, Iss. 26, pp. 6843-6848.

Muller et al. "Engineering Plastics from Lignin. IX. Phenolic Resin Synthesis and Characterization," The Journal of Adhesion, 1984, vol. 17, Iss. 3, pp. 185-206.

Ouyang et al., "Poly(Lactic Acid) Blended with Cellulolytic Enzyme Lignin: Mechanical and Thermal Properties and Morphology Evaluation," Journal of Polymers and the Environment, 2012, vol. 20, Iss. 1, pp. 1-9.

Pucciariello et al., "Physical properties of straw lignin-based polymer blends," Polymer, 2004, vol. 45, Iss. 12, pp. 4159-4169.

Rasal et al., "Poly(lactic acid) modifications," Progress in Polymer Science, 2010, vol. 35, Iss. 3, pp. 338-356.

Sahoo et al., "Enhanced properties of lignin-based biodegradable polymer composites using injection moulding process," Composites Part A: Applied Science and Manufacturing, 2011, vol. 42, Iss. 11, pp. 1710-1718.

Setua et al., "Lignin reinforced rubber composites," Polymer Composites, 2000, vol. 21, Iss. 6, pp. 988-995.

Shimamura et al. "Mechanical Properties of Carbon Nanofiber Reinforced Polylactic Acid," Key Engineering Materials: The Mechanical Behavior of Materials X, 2007, vol. 345-346, pp. 1225-1228.

Thielemans et al., "Novel applications of lignin in composite materials," Journal of Applied Polymer Science, 2002, vol. 83, Iss. 2, pp. 323-331.

Thielemans et al., "Butyrated kraft lignin as compatibilizing agent for natural fiber reinforced thermoset composites," Composites Part A: Applied Science and Manufacturing, 2004, vol. 35, Iss.3, pp. 327-338.

Thielemans et al., "Lignin Esters of Use in Unsaturated Thermosets: Lignin Modification and Solubility Modeling," Biomacromolecules, 2005, vol. 6, Iss. 4 pp. 1895-1905.

Li et al., "Thermal and mechanical properties of biodegradable blends of poly(L-lactic acid) and lignin," Polym Int., 2003, vol. 52, pp. 949-955.

Official Action for U.S. Appl. No. 13/850,447, mailed Sep. 4, 2014 6 pages Restriction Requirement.

Notice of Allowance for U.S. Appl. No. 13/850,447, mailed Nov. 21, 2014 9 pages.

* cited by examiner

LIGNIN EXTRACTION FROM LIGNOCELLULOSICS

CROSS REFERENCE TO RELATED APPLICATIONS

This non-provisional patent application claims the benefit of priority from U.S. Provisional Patent Application No. 61/695,852 filed Aug. 31, 2012, the entire disclosure of which is hereby incorporated by reference in its entirety.

TECHNICAL FIELD

This invention relates to the extraction of lignin from lignocellulosic biomass using lactic acid.

SUMMARY

As the lignocellulosic biorefining industry emerges as a viable fuels technology, the availability of the assortment of lignins will also expand. Lignin's physicochemical features that attribute to its prospective utilization in determining a value-added product includes a three dimensional aromatic-based structure and an abundance of reactive functional groups in order to manipulate the hydrophobicity of lignin.

Lignin is the second most abundant natural biopolymer on the planet following cellulose, and easily the least utilized despite its great potential as both a filler, and a thermal and mechanical property modifier for other biopolymers. Lignin is found in the rigid xylem cell wall in all vascular plants providing support, acting as a water sealant and as a protector against various biological attacks. As a natural glue, lignin consists of 15-40% of the total material in the plant cell walls. Lignin is composed of an arrangement of 3 different phenyl-propane units (PPU) crosslinked forming a complex structure that varies drastically from plant to plant. The three different PPUs; sinapyl alcohol, coniferyl alcohol, and p-coumaryl alcohol are illustrated in FIG. 1.

Lignin is industrially separated primarily using the sulfite, kraft, and soda pulping processes. Lignosulfonates today are: burned for energy, used as animal feedstock, agricultural and horticultural applications, additives in concrete, and utilized in lignin-phenol-formaldehyde resins. More than 99% of industrial produced kraft lignin's annual 70+ million tones are burned as a low value fuel in chemical recovery furnaces. The remaining kraft lignin has applications as rubber reinforcers, thermosetting and thermoplastic polymers, phenol-formaldehyde resins, panelboard adhesives, friction materials, and insulation. When lignin is isolated via the organosolv extraction process, it may be used for brake pads, oriented strand board (OSB), PF resins and polyurethane foams and epoxy-resins.

Lignin is industrially separated primarily using sulfite, kraft, and soda pulping processes. Alternatively, the so-called "organosolv" extraction process is performed with hot ethanol at moderately high temperatures (170-210° C.) and pressures; the resulting product is referred to as organosolv lignin. When lignin is isolated via this organosolv extraction process, it may be used for a filler in paints, brake pads, oriented strand board (OSB), PF resins, and in polyurethane foams and epoxy-resins.

The present invention relates to a novel lignin extraction process using lactic acid in place of ethanol. Data show that lactic acid is much more effective at extracting lignin from lignocellulosic biomass, such as corn stover, than ethanol. At about 55° C., about eleven times as much lignin is extracted from lignocellulosic biomass using lactic acid in place of ethanol. The extracted lignin may be precipitated from lactic acid by the addition of excess water and removed by filtration. Lactic acid may be regenerated by simple distillation. Accordingly, lignin extraction using lactic acid is potentially revolutionary in biorefining operations.

DESCRIPTION

Figure 1:
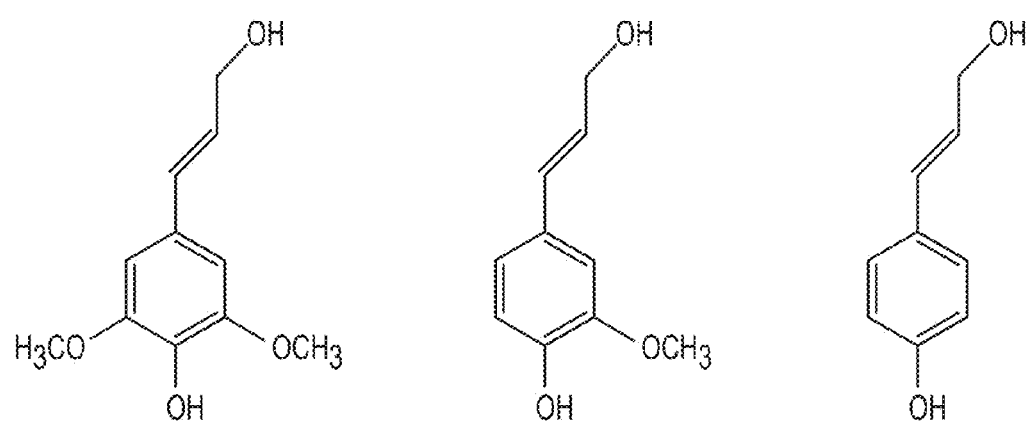
FIG. 1 illustrates three different phenyl-propane units—sinapyl alcohol, coniferyl alcohol and p-coumaryl alcohol.

The present invention relates to a novel lignin extraction process using lactic acid. Lignin was extracted from corn stover effectively via a novel extraction process based on lactic acid. Lignin extraction was compared to extraction utilizing ethanol and proved to be more effective. More than an order of magnitude more lignin may be extracted at about 55° C. when lactic acid is used in place of ethanol. The precipitation of lignin out of the lactic acid was facile, and may use additional water. Some aspects of the present invention include:

a method of extracting lignin from lignocellulosic biomass, the method comprising comminuting the lignocellulosic biomass to form a comminuted biomass, adding lactic acid to the comminuted biomass to form a prepared biomass and extracting lignin from the prepared biomass;

a method of extracting lignin, the method comprising mixing a lignocellulosic biomass with water, comminuting the lignocellulosic biomass to form a comminuted biomass; mixing the comminuted biomass with lactic acid to form a prepared biomass, and extracting lignin from the prepared biomass; and a method of extracting lignin, the method comprising comminuting a lignocellulosic biomass to form a comminuted biomass, mixing the comminuted biomass with lactic acid to form a prepared biomass, wherein a pH of the lactic acid has been adjusted to between about 1.4 to about 9 with a basic solution, and extracting lignin from the prepared biomass.

Currently, lignin is industrially separated primarily using sulfite, kraft, and soda pulping processes. The so-called "organosolv" extraction process is performed with hot ethanol at moderately high temperatures (between about 170° C. to about 210° C.) and pressures from one to several atmospheres. The resulting product is referred to as an organosolv lignin. Unfortunately, the high temperature and pressure requirements of organosolv extraction result in high production costs.

The present invention is directed to a lignin extraction process using lactic acid in place of ethanol. Lactic acid is much more effective at extracting lignin from lignocellulosic biomass than ethanol resulting in about eleven times as much lignin extracted from the lignocellulosic biomass at about 55° C. when lactic acid is used in place of ethanol. Additionally, the lignin may be precipitated by the addition of excess water.

In one embodiment, the lignocellulosic biomass may be corn stover. Corn stover is an exemplary material and will be referenced throughout the specification, although it should be understood that any suitable lignocellulosic biomass may be used, including but not limited to, sugarcane, straw, saw mill products, paper mill products, wood, switch grass and elephant grass and combinations thereof.

Corn stover may be added to approximately 85% lactic acid in water, ethanol, and sodium hydroxide using the present invention to extract lignin. Chemicals and reactants may be used as received, though it is understood that the chemicals and reactants may be refined without deviating from the invention.

The corn stover may be mulched or comminuted using any suitable method before the extraction process in order to increase the exposed surface area of the corn stover. Examples of suitable comminution processes include, but are not limited to, cutting, chopping, grinding, crushing, milling, micronizing and triturating and combinations thereof. In some embodiments, the mulching process may be performed in a laboratory blender or other suitable mixing, grinding, or homogenizing machine in the presence of a suitable solvent such as water at a ratio of about 340 mL of water for about 100 g of corn stover. Various ratios of water or lactic acid or combinations thereof may also be used during the comminution process. In some embodiments, the ratio of water to biomass exceeds a ratio of about 1:about 1. In some embodiments, the ratio of water to biomass is between about 2 to 1 up to about 6 to 1. In some embodiments, the ratio of water to the comminuted material is about 3.4:1, about 3:1, about 2.5:1, about 1.1, or about 0.5:1.

The comminuted material is mixed with lactic acid or a lactic acid/water mixture. The ratio of the lactic acid or lactic acid/water to corn stover may be about 3.4:1; about 3:1; about 2.5:1; about 2:1; or about 1:1. The mixture may be mixed in any suitable method. By way of example, the mixture may be mixed by stirring, shaking, vibrating, agitating, blending, tumbling, sonication, combinations thereof and the like. Following mulching or comminuting, the corn stover mulch may be filtered and dried at ambient or elevated temperatures by a wide variety of mechanisms including continuous or batch drying ovens or simply by evaporation in an indoor or outdoor ambient environment. The drying or extraction temperature may be between about 0° C. to about 500° C. In some embodiments, the temperature may be about 150° C.; about 120° C.; 110° C.; about 100° C.; about 90° C.; about 80° C.; about 70° C.; about 60° C.; about 50° C.; about 40° C.; about 30° C.; about 25° C.; about 20° C. or about 15° C. A range of times from a few minutes to several days may be utilized for drying depending on the particulars of the drying procedures utilized. Thus, the drying time may be about 1 minute; about 5 minutes; about 10 minutes; about 20 minutes; about 30 minutes; about 60 minutes; about 90 minutes; about 180 minutes; about 1 day; about 3 days; about 5 days; about 7 days or about 14 days. The solvent may be collected in order to fully account for all extracted lignin.

The pressure of the extraction may be between about 1 atm to about 200 atms. In some embodiments, the pressure may be about 1 atm; about 5 atms; about 10 atms; about 15 atms; about 20 atms; about 30 atms; about 40 atms; about 50 atms; about 60 atms; about 70 atms; about 80 atms; about 90 atms; about 100 atms; about 150 atms; and about 200 atms. Additionally, the solvent may be treated to collect lignin remaining in the solvent. Higher temperatures and pressures typically lead to greater extracted amounts while adding additional complexities and costs, thus there is an optimal set of conditions depending on the biomass source and equipment configuration which maximizes lignin extraction while minimizing processing costs.

Extractions may be performed using any suitable method, including but not limited to filtering, leaching, centrifuging, decanting, combinations thereof or the like.

Another aspect of the invention relates to the effect of changing the lactic acid pH. Extractants having pHs of between about 5 and about 9 exhibit increased viscosity. In some embodiments, the extractant had a pH of about 5; about 6; about 7; about 8 and about 9. The original pH of the lactic acid of about 1.4 was altered by addition of sodium hydroxide, though any suitable basic solution may be used, including but not limited to potassium hydroxide, calcium hydroxide, and sodium hydroxide. Lactic acid/water mixtures having pHs of about 1.4, about 5, about 7, and about 9 were all prepared, verified, and used in extraction experiments.

EXAMPLES

Corn stover was collected and mulched. The mulched corn stover was added to lactic acid in about 1% increments to make samples of 1-10 weight percent corn stover. The samples were agitated using any suitable method, such as a shaker table running at about 200 RPMs. Extractions may be performed between about 0° C. to about 500° C. In some embodiments, extractions were performed between about 25° C. and about 55° C. for 3 weeks.

Corn stover loading levels greater than about 5 wt % did not allow for adequate mixing in the simple shaker table apparatus. Extractants having pHs of about 5, about 7, and about 9 exhibited increased viscosity. This increased viscosity significantly limited mixing. In fact, samples with pHs of about 7 and about 9 were effectively gelled and so were not tested in the shake table apparatus. Extract samples with a starting pHs of about 1.4 and about 5 were verified with pH meter to ensure the pH remained unchanged at the end of the extraction. These samples were thoroughly filtered before being analyzed by UV-Vis spectrometry. There are noticeable effects for these highly loaded samples.

Figure 2:
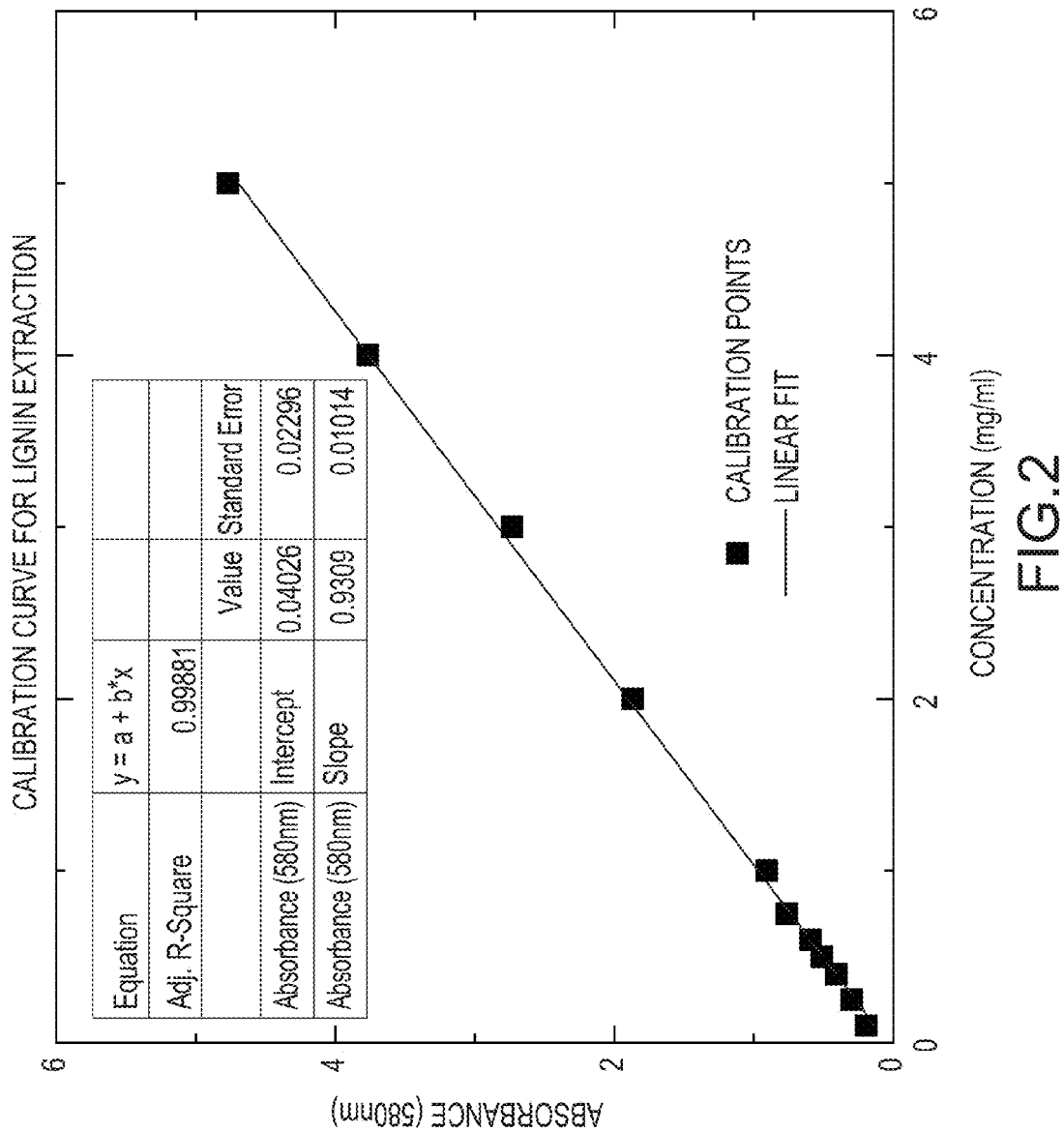
FIG. 2 illustrates a calibration curve of absorbance as a function of dissolved lignin concentrations when lactic acid is used for the extraction.

UV-Vis calibration curves were made using organosolv lignin in lactic acid (about 85% in water) at known concentrations. Absorbance at a wavelength of about 580 nm was selected based on its correspondence with the yellow-brown color of the dissolved lignin samples. The resulting calibration curve of absorbance at about 580 nm as a function of dissolved lignin is illustrated in FIG. 2. The lignin extraction samples were measured using the UV-Vis spectrometer and the extract concentrations were calculated from the calibration curve.

Figure 3:
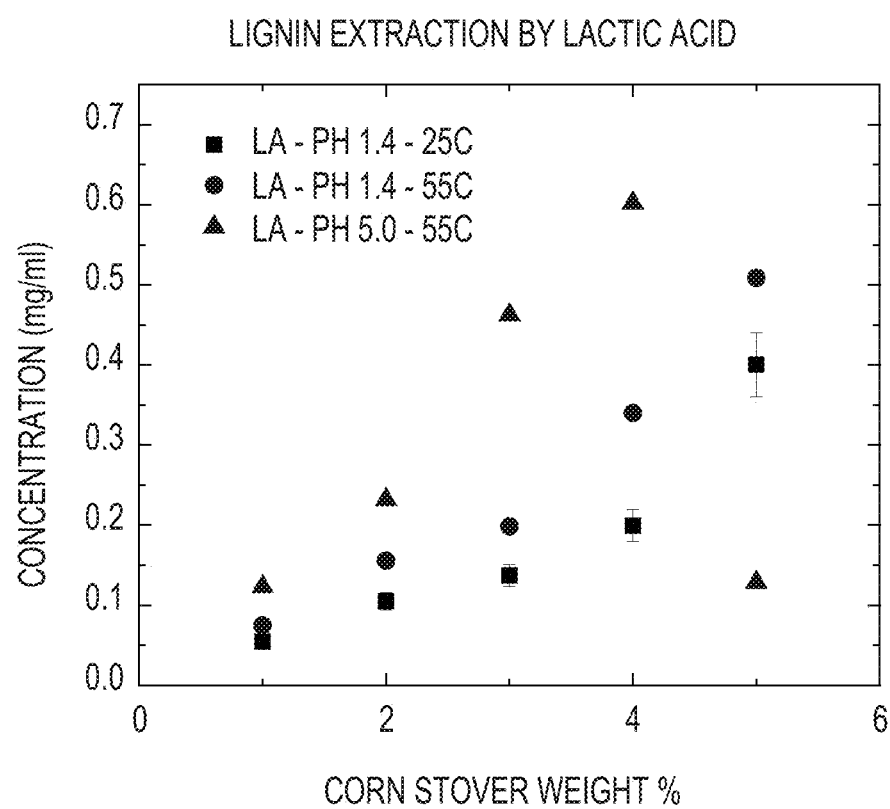
FIG. 3 illustrates concentrations of extracted lignin as a function of corn stover percentages for varying pHs of lactic acids.

Concentrations of the extracted lignin as a function of the corn stover loading are illustrated in FIG. 3. The concentration of extracted lignin increases as the temperature is raised from about 25° C. to about 55° C. The average extract concentration increases by about 28% with only a modest about 30° C. change in temperature for samples with the same pH. FIG. 3 also illustrates that lactic acid adjusted to a higher pH of about 5 increases the amount of lignin extracted. The approximate 5 wt % extraction at about pH 5 had a high viscosity that prevented complete mixing leading to low extracted values as measured by UV-Vis. Excluding the 5 wt % corn stover at about pH 5 data point, the average increase in lignin concentration due to changing the pH was about 54%.

Figure 4:
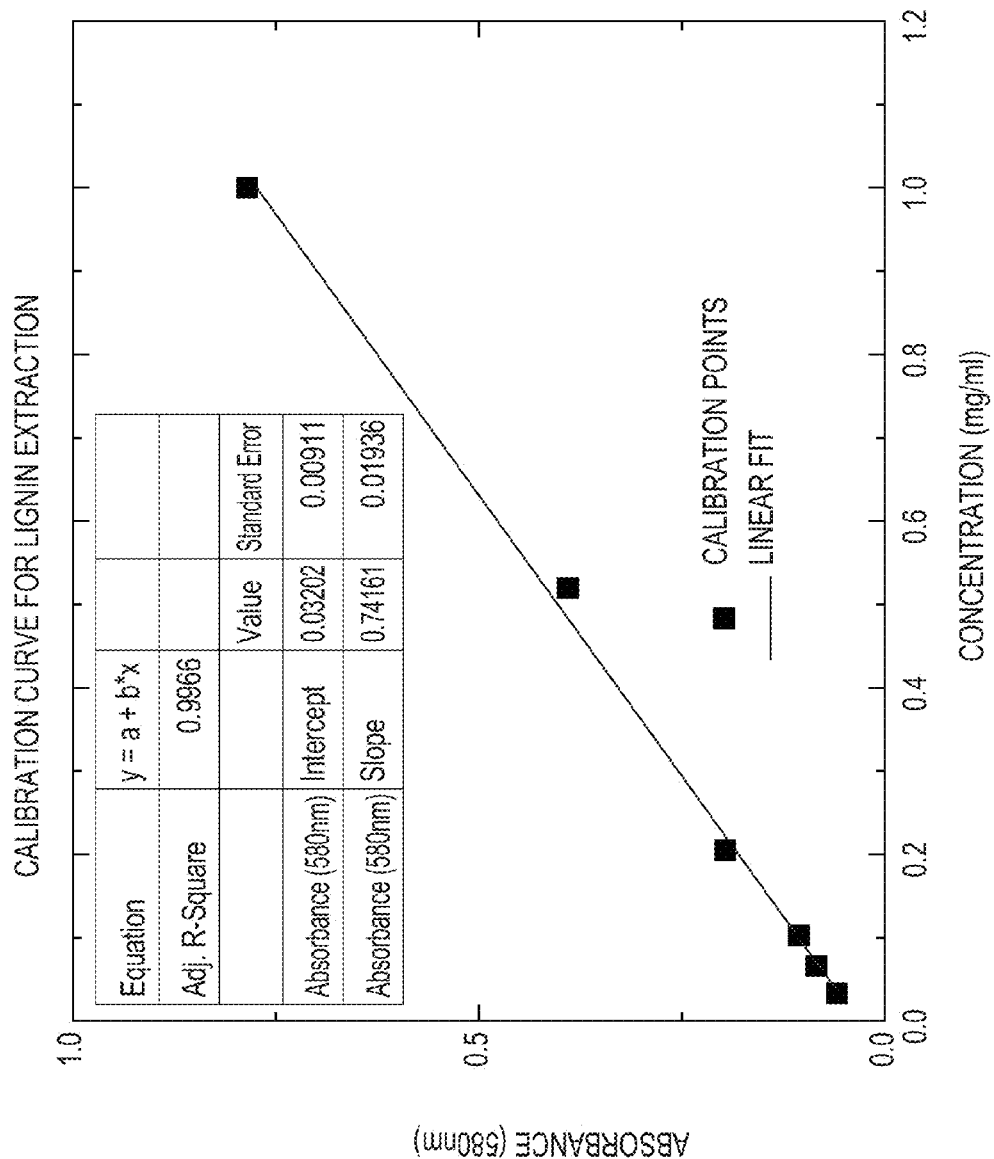
FIG. 4 illustrates a calibration curve f absorbance as a function of dissolved lignin concentrations when ethanol is used for the extraction.
Figure 5:
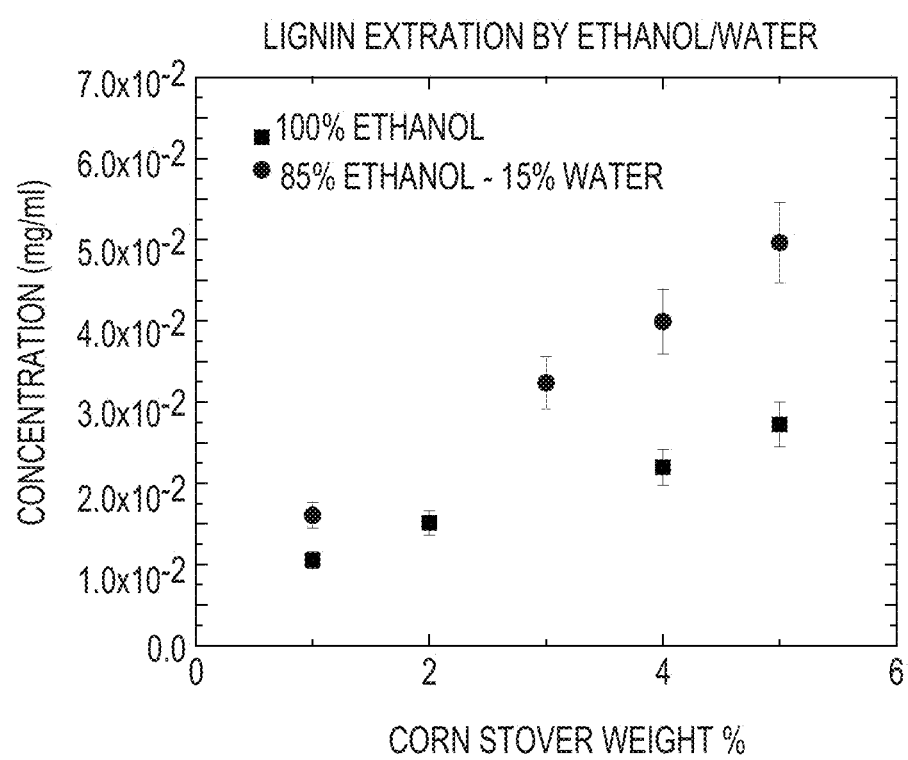
FIG. 5 illustrates concentrations of extracted lignin as a function of corn stover percentages for ethanol and ethanol with water.

The lactic acid based extraction process was compared to extraction utilizing an 85/15 wt % ethanol/water mixture. A calibration curve was produced using known concentrations of organosolv lignin and is illustrated in FIG. 4. Ethanol/water extraction samples were analyzed by UV-Vis and the extracted lignin concentrations were calculated from the calibration curve. Concentrations of extracted lignin as a function of corn stover loading are illustrated in FIG. 5. As illustrated in FIG. 5, extraction performed with water in addition to the ethanol was more effective than pure ethanol. When compared to the lactic acid extraction with a about pH of 1.4 (FIG. 3), the ethanol/water mixture extracted about 11 times less lignin at about 55° C. It must be remarked that this is a considerable difference and lactic acid provides an increase of more than an order of magnitude in extracted lignin.

In order to validate the idea that lactic acid could indeed be used in industrially to replace the hot ethanol organosolv process, lignin was precipitated out of the lactic acid. Both water and cyclohexane were tested as separate agents for precipitating lignin from lactic acid. Organosolv lignin was added to lactic acid to achieve an about 25 mg/mL concentration. The solution was sonicated for an hour to ensure complete dissolution. Subsequently separate addition of water and cyclohexane appear to successfully precipitate lignin.

Figure 6:
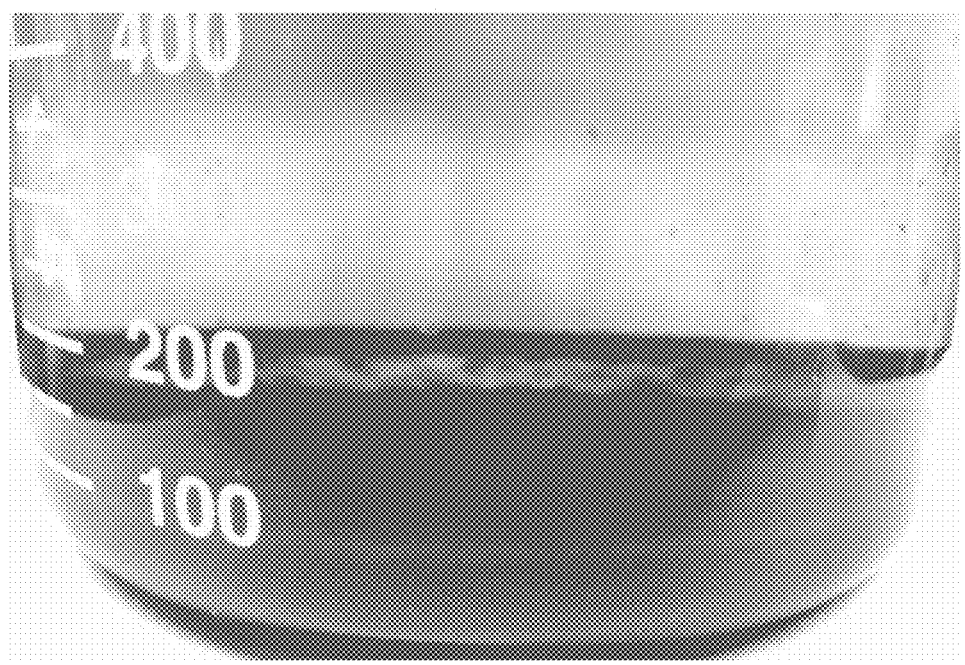
FIG. 6 illustrates precipitated lignin in the presence of water.

FIG. 6 is a photograph of the precipitation in the presence of water. FIG. 6 illustrates the lignin was successfully precipitated from the lactic acid with the addition of water. This result indicates the process is a promising replacement for industrial application which may result in a cost savings when using lactic acid instead of ethanol.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of extracting lignin from lignocellulosic biomass, the method comprising:
   comminuting the lignocellulosic biomass to form a comminuted biomass;
   providing an adjusted lactic acid solution, wherein a pH of a lactic acid solution is adjusted to between about 4 and 9 with a basic solution, wherein the basic solution comprises sodium hydroxide, calcium hydroxide or potassium hydroxide;
   adding the adjusted lactic acid solution to the comminuted biomass to form a prepared biomass; and
   extracting lignin from the prepared biomass.

2. The method of claim 1, wherein the extracting lignin occurs at a temperature between about 0° C. and about 75° C.

3. The method of claim 1, wherein the extracting lignin occurs at a temperature of about 25° C.

4. The method of claim 1, wherein the extracting lignin occurs at a pressure between about 1 atm and about 200 atms.

5. The method of claim 1, wherein the biomass is comminuted in the presence of water at a specified ratio of water to the lignocellulosic biomass ranging from about 0.1 to 1.0 up to 10.0 to 1.0.

6. The method of claim 5 wherein the specified ratio of water to biomass exceeds about 1:about 1.

7. The method of claim 5, wherein the specified ratio of water to biomass is between about 2:about 1 and about 6:about 1.

8. The method of claim 1, wherein a ratio of the adjusted lactic acid solution to the comminuted biomass is between about 1:about 1 and about 3.4:about 1.

9. The method of claim 1, wherein the lignocellulosic biomass is at least one of a corn stover, a sugarcane, straw, a saw mill product, a paper mill product, a wood, a switch grass, an elephant grass and combinations thereof.

10. The method of claim 9, wherein the lignocellulosic biomass is corn stover.

11. The method of claim 1, wherein the comminuting is at least one of a cutting, a chopping, a grinding, a crushing, a milling, a micronizing, a triturating and combinations thereof.

12. A method of extracting lignin, the method comprising:
    mixing a lignocellulosic biomass with water;
    comminuting the lignocellulosic biomass to form a comminuted biomass;
    providing an adjusted lactic acid solution, wherein a pH of the adjusted lactic acid solution is adjusted to between about 4 and 9 with a basic solution, wherein the basic solution comprises sodium hydroxide, calcium hydroxide or potassium hydroxide;
    mixing the comminuted biomass with the adjusted lactic acid solution to form a prepared biomass; and
    extracting lignin from the prepared biomass.

13. The method of claim 12, wherein the extraction occurs at a temperature between about 0° C. and about 500° C.

14. The method of claim 12, wherein the extraction occurs at a pressure between about 1 atm and about 200 atms.

15. The method of claim 12, wherein the adjusted lactic acid solution further comprises ethanol and water.

16. The method of claim 12, wherein the lignocellulosic biomass is comminuted in the presence of water at a specified ratio of water to the lignocellulosic biomass ranging from about 0.1:about 1.0 to about 10.0:about 1.0.

17. The method of claim 16 wherein the specified ratio of water to the lignocellulosic biomass exceeds about 1:about 1.

18. The method of claim 12, wherein the extracting lignin occurs at a temperature between about 0° C. and about 75° C.

19. A method of extracting lignin, the method comprising:
    comminuting a lignocellulosic biomass to form a comminuted biomass;
    mixing the comminuted biomass with an adjusted lactic acid solution to form a prepared biomass, wherein a pH of the adjusted lactic acid solution has been adjusted to between about 4 to about 9 with a basic solution, wherein the basic solution comprises sodium hydroxide, calcium hydroxide or potassium hydroxide;
    extracting lignin from the prepared biomass.

20. The method of claim 19, wherein the basic solution comprises sodium hydroxide.

* * * * *